(12) United States Patent
Cosgrove et al.

(10) Patent No.: US 10,220,674 B2
(45) Date of Patent: Mar. 5, 2019

(54) TARGET EVAPORATOR OUTLET TEMPERATURE MAPS FOR VEHICLE AIR CONDITIONING CONTROL

(71) Applicant: Toyota Motor Engineering & Manufacturing North America, Inc., Erlanger, KY (US)

(72) Inventors: David W. Cosgrove, Royal Oak, MI (US); Hidekazu Hirabayashi, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 321 days.

(21) Appl. No.: 15/287,762

(22) Filed: Oct. 7, 2016

(65) Prior Publication Data
US 2018/0099540 A1   Apr. 12, 2018

(51) Int. Cl.
*B60H 1/00* (2006.01)
*G01K 13/02* (2006.01)

(52) U.S. Cl.
CPC ..... *B60H 1/00735* (2013.01); *B60H 1/00585* (2013.01); *G01K 13/02* (2013.01); *G01K 2013/026* (2013.01); *G01K 2201/02* (2013.01)

(58) Field of Classification Search
None
See application file for complete search history.

(56) References Cited

U.S. PATENT DOCUMENTS

| 3,960,322 A | * | 6/1976 | Ruff | F03G 6/00 |
| | | | | 62/228.1 |
| 4,018,581 A | * | 4/1977 | Ruff | F03G 6/00 |
| | | | | 237/2 B |
| 4,313,305 A | * | 2/1982 | Egosi | C02F 1/16 |
| | | | | 203/DIG. 20 |

(Continued)

FOREIGN PATENT DOCUMENTS

CN   202204224 U   * 4/2012
CN   104972894 B   * 10/2017

(Continued)

*Primary Examiner* — Shelley Chen
(74) *Attorney, Agent, or Firm* — Christopher G. Darrow; Darrow Mustafa PC

(57) ABSTRACT

A vehicle heating, ventilating, and air conditioning (HVAC) system can reduce a load applied to a vehicle powertrain during certain conditions. The system can include a compressor operable based on a first target evaporator outlet (TEO) temperature map. Systems and methods can determine if an HVAC system is activated, and whether an engine water temperature meets a forced HVAC recirculation intake threshold. Responsive to determining that the engine water temperature meets the forced HVAC recirculation intake threshold, it can be determined if the engine water temperature meets a first threshold. Responsive to the recirculation mode air source being selected, determining if at least one measured vehicle condition meets predetermined criteria. Responsive to determining that the engine water temperature meets the first threshold, the compressor can be operated based on a second TEO temperature map, the second TEO temperature map including higher TEO temperatures than the first TEO temperature map.

20 Claims, 4 Drawing Sheets

(56) References Cited

U.S. PATENT DOCUMENTS

| | | | |
|---|---|---|---|
| 4,804,139 A * | 2/1989 | Bier | F01P 7/08 123/41.15 |
| 5,497,941 A * | 3/1996 | Numazawa | B60H 1/004 237/2 A |
| 7,100,383 B2 | 9/2006 | Sugesawa et al. | |
| 7,562,698 B2 * | 7/2009 | Fujiki | B60H 1/3208 165/11.1 |
| 8,467,936 B2 | 6/2013 | Wijaya et al. | |
| 9,511,647 B2 * | 12/2016 | Nishikawa | B60H 1/00885 |
| 2002/0043072 A1 * | 4/2002 | Hamachi | B60H 1/00764 62/230 |
| 2002/0157414 A1 * | 10/2002 | Iwanami | B60H 1/00778 62/239 |
| 2003/0172667 A1 * | 9/2003 | Takano | B60H 1/3208 62/202 |
| 2004/0011068 A1 * | 1/2004 | Hatakeyama | B60H 1/00849 62/228.1 |
| 2004/0134204 A1 * | 7/2004 | Honda | B60H 1/004 62/134 |
| 2005/0193747 A1 * | 9/2005 | Kajimoto | B60H 1/00778 62/133 |
| 2005/0241818 A1 * | 11/2005 | Yakumaru | B60H 1/004 165/202 |
| 2008/0148731 A1 * | 6/2008 | Cao | F01B 29/10 60/641.2 |
| 2010/0122882 A1 * | 5/2010 | Komorowski | F16D 27/105 192/35 |
| 2013/0319026 A1 | 12/2013 | Tsuji et al. | |
| 2017/0101933 A1 * | 4/2017 | Mukhopadhyay | F01D 11/24 |

FOREIGN PATENT DOCUMENTS

| | | | | |
|---|---|---|---|---|
| JP | 06137148 A | * | 5/1994 | F01P 7/048 |
| JP | 2704725 B2 | * | 1/1998 | |
| JP | 2001121951 A | * | 5/2001 | B60H 1/3208 |
| JP | 2002120551 A | * | 4/2002 | B60H 1/00764 |
| JP | 2004027945 A | * | 1/2004 | |
| JP | 2004330869 A | * | 11/2004 | |
| JP | 2004336832 A | * | 11/2004 | |
| JP | 2012172956 A | * | 9/2012 | |
| JP | 5482754 B2 | * | 5/2014 | |
| JP | 5577276 B2 | * | 8/2014 | |

\* cited by examiner

TARGET EVAPORATOR OUTLET TEMPERATURE MAPS FOR VEHICLE AIR CONDITIONING CONTROL

FIELD

The subject matter described herein relates in general to vehicle air conditioning systems and, more particularly, to the control of vehicle air conditioning systems based on a target evaporator outlet temperature.

BACKGROUND

Vehicles can include air conditioning systems to cool an interior passenger compartment. Such air conditioning systems can cycle a refrigerant fluid through a refrigeration cycle. For example, a compressor can be powered by a vehicle powertrain and used to compress refrigerant vapor to a higher pressure. The compressed refrigerant can be routed through a condenser, where the refrigerant can be cooled. The cooled refrigerant can be routed to an evaporator where the liquid refrigerant evaporates back to a vapor state as the refrigerant receives heat from air blown by a blower. The use of an air conditioning system, including the operation of a compressor, can result in an increased load on a vehicle engine.

SUMMARY

In one respect, the present disclosure is directed to a method of operating a heating, ventilating, and air conditioning (HVAC) system in a vehicle, where the HVAC system includes a compressor operable based on a first target evaporator outlet (TEO) temperature map. The method includes determining whether an engine water temperature meets a forced HVAC recirculation intake threshold. Responsive to determining that the engine water temperature meets the forced HVAC recirculation intake threshold, the method includes determining if the engine water temperature meets a first threshold. Responsive to determining that the engine water temperature meets the first threshold, the method includes operating the compressor based on a second TEO temperature map, the second TEO temperature map including higher TEO temperatures than the first TEO temperature map.

In another respect, the present disclosure is directed to a vehicle heating, ventilating, and air conditioning (HVAC) system. The system includes a sensor system operable to measure an engine water temperature and a compressor configured for operation based on a first target evaporator outlet (TEO) temperature map. The system further includes a controller operatively connected to the sensor system and the compressor. The controller can be programmed to initiate executable operations. The operations include determining whether an engine water temperature meets a forced HVAC recirculation intake threshold. The operations further include determining if the engine water temperature meets a first threshold responsive to determining that the engine water temperature meets the forced HVAC recirculation intake threshold. The operations include operating the compressor based on a second TEO temperature map, the second TEO temperature map including higher TEO temperatures than the first TEO temperature map responsive to determining that the engine water temperature meets the first threshold.

In yet another respect, the present disclosure is directed to a method of operating a heating, ventilating, and air conditioning (HVAC) system in a vehicle, wherein the HVAC system includes a compressor operable based on a first target evaporator outlet (TEO) temperature map. The method includes determining whether an engine water temperature meets a forced HVAC recirculation intake threshold. Responsive to determining that the engine water temperature meets the forced HVAC recirculation intake threshold, the method includes determining if the engine water temperature meets a first threshold, determining if the engine water temperature meets a second threshold, and determining if the engine water temperature meets a third threshold. Responsive to determining that the engine water temperature meets the first threshold but not the second or third thresholds, the method includes operating the compressor based on a second TEO temperature map, the second TEO temperature map including higher TEO temperatures than the first TEO temperature map. Responsive to determining that the engine water temperature meets the first and second thresholds but not the third threshold, the method includes operating the compressor based on a third TEO temperature map, the third TEO temperature map including higher TEO temperatures than the second TEO temperature map. Responsive to determining that the engine water temperature meets the first, second, and third thresholds, the method includes operating the compressor based on a fourth TEO temperature map, the fourth TEO temperature map including higher TEO temperatures than the third TEO temperature map.

DETAILED DESCRIPTION

Figure 1:
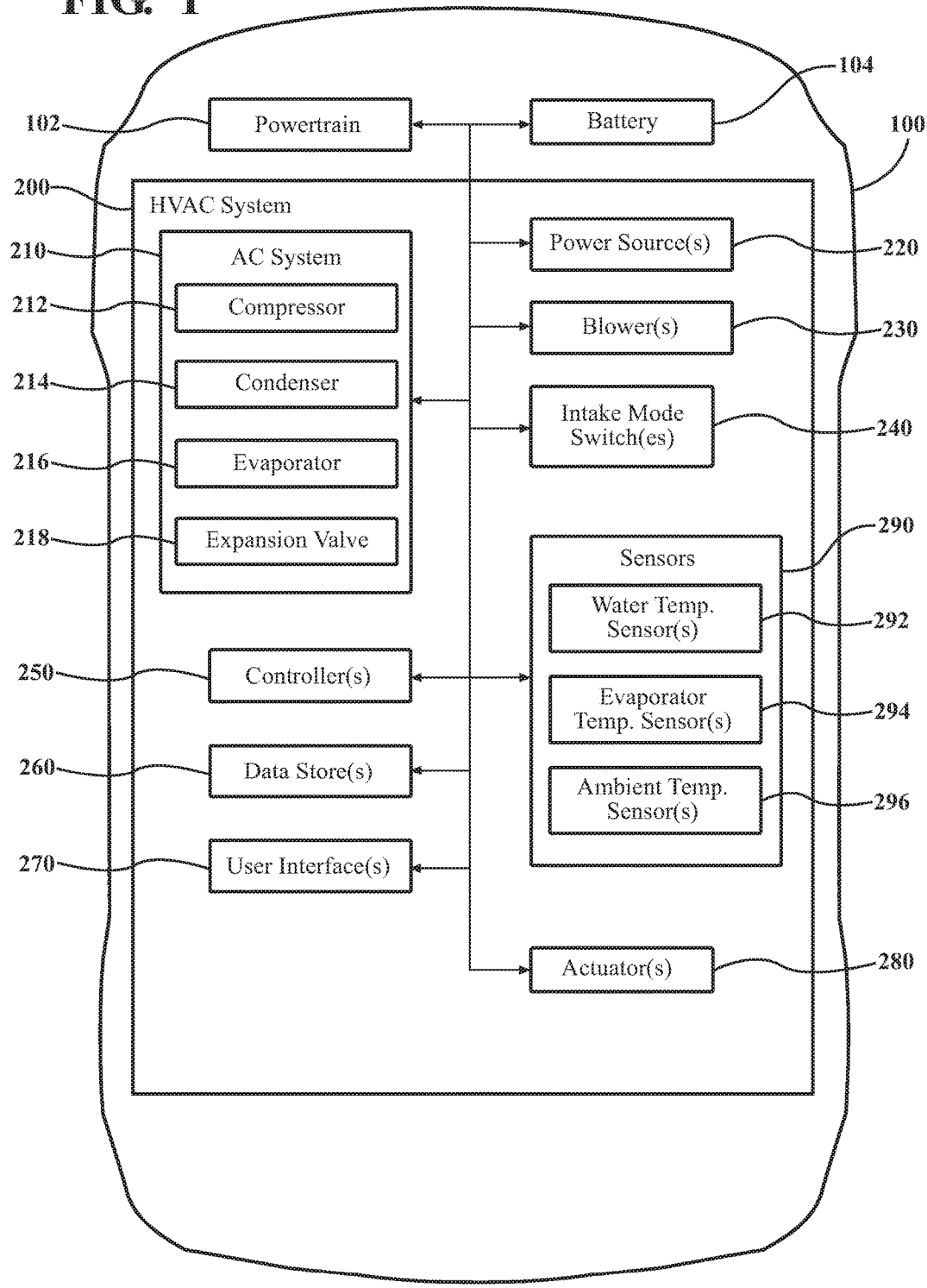
FIG. 1 is an example of a vehicle having a heating, ventilating, and air conditioning system.

This detailed description relates to the operation of vehicle heating, ventilating, and air conditioning (HVAC) systems to reduce a load applied to a vehicle powertrain during certain conditions. The HVAC system can include a compressor operable based on a target evaporator outlet (TEO) temperature. Systems and methods can determine if a power state of an HVAC system is activated, and whether an engine water temperature meets a forced HVAC recirculation intake threshold. Responsive to determining that the engine water temperature meets the forced HVAC recirculation intake threshold, it can be determined if the engine water temperature meets one or more thresholds. The HVAC system can be operated based on a predetermined TEO temperature map that provides TEO temperatures as a function of ambient temperature. The TEO temperature map can be chosen from a plurality of maps and based on whether the engine water temperature meets the one or more thresholds. The present detailed description relates to systems and methods that incorporate one or more of such features. In at least some instances, such systems and methods can reduce the load applied to a vehicle powertrain during operation of a variable compressor of an HVAC system.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include a powertrain 102 to generate power. As used herein, "powertrain" can include any component or group of components of the vehicle 100 that generates and/or transfers power used by the vehicle 100 for movement. In one or more arrangements, the powertrain 102 can include an engine and an energy source to generate power. The engine can be any suitable type of engine or motor, now known or later developed. For instance, the engine can be an internal combustion engine, an electric motor, a steam engine, and/or a Stirling engine, just to name a few possibilities. In some embodiments, the engine can include a plurality of engine types. For instance, a gas-electric hybrid vehicle can include a gasoline engine and an electric motor.

The energy source can be any suitable source of energy that can be used to at least partially power the engine. The engine can convert energy from the energy source into mechanical energy. Examples of energy sources include gasoline, diesel, propane, hydrogen, other compressed gas-based fuels, ethanol, solar panels, batteries, and/or other sources of electrical power. Alternatively or in addition, the energy source can include fuel tanks, batteries, capacitors, and/or flywheels. In some embodiments, the energy source can be used to provide energy for other systems of the vehicle 100.

The vehicle 100 can include battery 104 to store electrical energy for the vehicle 100. The battery 104 can provide electrical energy to power a variety of vehicle systems. For instance, the battery 104 can power a vehicle ignition system, lights, on-board electronics, as well as any other electronic device connected within the vehicle 100. In one or more arrangements, the battery 104 can be a lead-acid battery including six 2.1 volt cells to provide a nominally 12-volt battery system. The battery 104 can be configured for recharging by an engine of the powertrain 102. In one or more arrangements, the battery 104 can provide an energy source for the powertrain 102.

The vehicle 100 can include a heating, ventilating, and air conditioning (HVAC) system 200. The HVAC system 200 can change the environment or climate of an interior compartment of the vehicle 100. Some of the possible elements of the HVAC system 200 are shown in FIG. 1 and will be described. It will be understood that it is not necessary for the HVAC system 200 to have all of the elements shown in FIG. 1 or described herein. The HVAC system 200 can have any combination of the various elements shown in FIG. 1. Further, the HVAC system 200 can have additional elements to those shown in FIG. 1.

The HVAC system 200 can include an air conditioning (AC) system 210. The AC system can have any configuration to allow for cooling and/or humidity control for at least a portion of the vehicle 100. In one or more arrangements, the AC system 210 can include a refrigerant (not shown), a compressor 212, a condenser 214, an evaporator 216, and/or an expansion valve 218. Further, the AC system 210 can have additional elements to those shown in FIG. 1. In some arrangements, the AC system 210 may not include one or more of the elements shown in FIG. 1. The various elements of the AC system 210 can be arranged in any suitable manner and/or can be operatively connected to each other in any suitable manner.

The compressor 212 can direct or facilitate the movement of refrigerant throughout the AC system 210. In one or more arrangements, the compressor 212 can increase the pressure of the refrigerant vapor, such as by reducing a volume of the vapor.

The compressor 212 can have any suitable configuration for the AC system 210. As non-limiting examples, the compressor 212 can include a rotary compressor, a reciprocating compressor, a centrifugal compressor, and/or an axial compressor. The compressor 212 can be powered by any suitable power source within the vehicle 100. In one or more arrangements, the compressor 212 can be powered by the powertrain 102. For example, a belt can be used to transfer rotational energy from the engine to the compressor 212. Alternatively or in addition, the compressor 212 can be powered by an electric motor powered by the battery 104.

In one or more arrangements, the compressor 212 can be a fixed compressor. As used herein, "fixed compressor" or "fixed displacement compressor" can include any compressor having a constant pumping capacity. Alternatively or in addition, the compressor 212 can be a variable compressor. As used herein, "variable compressor" or "variable displacement compressor" can include any compressor configured to vary a pumping capacity over time.

The condenser 214 can cool and condense the refrigerant to a liquid state. The condenser 214 can have any suitable configuration for the AC system 210. In one or more arrangements, the condenser 214 be any form of a heat exchanger. For example, the condenser 214 can include coiled tubing. In some arrangements, fins can be connected to the tubing to increase a surface area of a material that is in contact with the refrigerant. In one or more arrangements, the condenser 214 can allow a fluid, such as air, to be directed through the condenser 214. For example, a fan can be operated in close proximity to the condenser to blow air across the coils and/or fins.

The evaporator 216 can allow and/or cause the transition of a refrigerant from a liquid state to a gaseous state. The evaporator 216 can allow heat transfer between the refrigerant and air surrounding the evaporator 216. In one or more arrangements, the evaporator 216 can include coiled tubes for the refrigerant to be routed through. Hotter air can be blown across the evaporator 216. In one or more arrangements, the air moving across the evaporator 216 heats the refrigerant to a warmer temperature and ultimately evaporates the refrigerant from a liquid state to a gaseous state. The air being blown across the evaporator 216 can be cooled and routed into the passenger compartment of the vehicle 100.

In one or more arrangements, the evaporator 216 can collect condensation at exterior surfaces during the operation of AC system 210. For instance, as the refrigerant cools within the evaporator 216, moisture from air around the evaporator 216 can condense on the exterior surface(s) of the evaporator 216.

The expansion valve 218 can facilitate change in pressures of the refrigerant. For instance, the expansion valve 218 can be located between the condenser 214 and the evaporator 216. In one or more arrangements, the expansion valve 218 can allow the liquid refrigerant to undergo an abrupt decrease in pressure and decrease in temperature as the refrigerant moves from the condenser 214 to the evaporator 216.

The HVAC system 200 can include one or more power sources 220 to provide mechanical or electrical power to one or more elements of the HVAC system 200. In one or more arrangements, the power source(s) 220 can include the battery 104. Alternatively or in addition, the power source(s) 220 can include other power sources. For example, the power source(s) 220 can include additional batteries and/or generators.

The HVAC system 200 can include one or more blowers 230 to direct and/or cause the movement of air or other fluid/gas. As used herein, "air" can include any gaseous fluid. For example, air can include environmental gas in and/or around the vehicle 100. The blower(s) 230 can direct and/or cause the movement of air into a passenger compartment of the vehicle 100. In one or more arrangements, the blower(s) 230 can move air across the evaporator 216 when the AC system 210 is being operated. In one or more arrangements, the blower(s) 230 can include a blower motor and one or more fans to move a quantity of air past the evaporator 216 and through air ducts into the passenger compartment of the vehicle 100. For instance, the blower(s) 230 can direct air over tubing and/or coils of the evaporator 216 to allow the refrigerant flowing through the evaporator 216 to remove heat from the air. In one or more arrangements, the blower(s) 230 can be powered by the powertrain 102, the battery 104, and/or the power source(s) 220.

The HVAC system 200 can include one or more intake mode switches 240 to control the source of air being introduced to the HVAC system 200 and/or the vehicle 100. In one or more arrangements, the intake mode switch(es) 240 can allow the selection of a source of air being introduced to the blower(s) 230. For instance, the source of air can be outside of a passenger compartment and/or outside of the vehicle 100, referred to as "fresh mode air source". Additionally, the source of air can be within the passenger compartment, referred to as "recirculation mode air source." In one or more arrangements, the intake mode switch(es) 240 can be operated to change the air source selection between a fresh mode air source, a recirculation mode air source, and/or a mix of both modes.

The HVAC system 200 can include one or more controllers 250. "Controller" means any component or group of components that are configured to execute any of the processes described herein or any form of instructions to carry out such processes or cause such processes to be performed. The controller(s) 250 may be implemented with one or more general-purpose and/or one or more special-purpose processors. Examples of suitable controllers include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a processor. The controller(s) 250 can include at least one hardware circuit (e.g., an integrated circuit) configured to carry out instructions contained in program code. In arrangements in which there is a plurality of controllers 250, such controllers can work independently from each other or one or more controllers can work in combination with each other.

The controller 250 can cause, directly or indirectly, one or more elements of the HVAC system 200 to be activated or deactivated. As used herein, "cause" or "causing" means to make, force, compel, direct, command, instruct, and/or enable an event or action to occur or at least be in a state where such event or action may occur, either in a direct or indirect manner. In one or more arrangements, the controller(s) 250 can be an HVAC electronic control unit (ECU). In one or more arrangements, the controller 250 can cause, directly or indirectly, a change in the duty, or displacement, of a variable compressor 212.

The HVAC system 200 can include one or more data stores 260 for storing one or more types of data. The data store 260 can include volatile and/or non-volatile memory. Examples of suitable data stores 260 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 260 can be a component of the controller(s) 250, or the data store 260 can be operatively connected to the controller(s) 250 for use thereby. The term "operatively connected," as used throughout this description, can include direct or indirect connections, including connections without direct physical contact. In one or more arrangements, the data store(s) 260 can include instructions to allow the controller 250 to operate one or more elements of the HVAC system 200.

The HVAC system 200 can include one or more user interface(s) 270. In one or more arrangements, the user interface(s) 270 can include an input system and/or an output system. An "input system" includes any device, component, system, element or arrangement or groups thereof that enable information/data to be entered into a machine. The input system can receive an input from a vehicle occupant (e.g. a driver or a passenger). Any suitable input system can be used, including, for example, a keypad, display, touch screen, multi-touch screen, button, joystick, mouse, trackball, microphone and/or combinations thereof. An "output system" includes any device, component, system, element or arrangement or groups thereof that enable information/data to be presented to a vehicle occupant (e.g. a person, a vehicle occupant, etc.). The output system can present information/data to a vehicle occupant. The output system can include a display. Alternatively or in addition, the output system may include a microphone, earphone and/or speaker. Some components of the vehicle 100 may serve as both a component of the input system and a component of the output system. In one or more arrangements, the user interface(s) 270 can include a vehicle head unit.

The vehicle 100 can include one or more actuators 280. The actuators 280 can be any element or combination of elements operable to modify, adjust and/or alter one or more components of the HVAC system 200 and/or the vehicle 100 responsive to receiving signals or other inputs from the controller(s) 250. Any suitable actuator can be used. For instance, the one or more actuators 280 can include motors, pneumatic actuators, hydraulic pistons, relays, solenoids, and/or piezoelectric actuators, just to name a few possibilities.

The HVAC system 200 can include one or more sensors 290. "Sensor" means any device, component and/or system that can detect, determine, assess, monitor, measure, quantify and/or sense something. The one or more sensors can detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which there are a plurality of sensors 290, the sensors can work independently from each other. Alternatively, two or more of the sensors can work in combination with each other. In such case, the two or more sensors can form a sensor network. The sensors 290 can be operatively connected to the controller(s) 250, the data store(s) 260, and/or other element of the HVAC system 200 (including any of the elements shown in FIG. 1). The sensors 290 can include any suitable type of sensor. Various examples of different types of sensors will be described herein. However, it will be understood that the embodiments are not limited to the particular sensors described.

The sensors 290 can include one or more water temperature sensors 292. The water temperature sensor(s) 292 can sense a temperature of an engine cooling water, also known as a long life coolant (LLC). As used herein, "engine water" or "engine cooling water" includes any fluid used for the cooling of one or more components of an engine of the vehicle 100. For example, engine water can include water, antifreeze, anti-corrosive fluids, glycol, and/or mixtures thereof. The water temperature sensor(s) 292 can be any suitable sensor. For example, the water temperature sensor(s) 292 can include a mechanical thermometer, a bimetal sensor, a thermistor, a thermocouple, a resistance thermometer, and/or a silicon bandgap sensor. In one or more arrangements, the water temperature sensor(s) 292 can be at least partially located within, on, or proximate to a vehicle engine.

The sensors 290 can include one or more evaporator temperature sensors 294 to detect, determine, assess, monitor, measure, quantify, and/or sense a temperature of at least a portion of the evaporator 216 of the AC system 210. As used herein, "evaporator temperature" can include the temperature of a refrigerant within the evaporator and/or a temperature of the evaporator itself. The evaporator temperature sensor(s) 294 can be any suitable sensor that can sense an evaporator temperature. For example, the evaporator temperature sensor(s) 294 can include a mechanical thermometer, a bimetal sensor, a thermistor, a thermocouple, a resistance thermometer, and/or a silicon bandgap sensor.

In one or more arrangements, the evaporator temperature sensor(s) 294 can be configured to sense a temperature at or near an outlet of the evaporator 216. In some arrangements, the evaporator temperature sensor(s) 294 can be in direct physical contact with a portion of the evaporator 216. For instance, the evaporator temperature sensor(s) 294 can sense the temperature of an interior and/or exterior surface of an outlet of the evaporator 216. Alternatively or in addition, the evaporate temperature sensor(s) 294 can be spaced from the evaporator 216.

The sensors 290 can include one or more ambient temperature sensors 296. The ambient temperature sensor(s) 296 can be configured to sense an ambient temperature outside of the vehicle 100. As used herein, "ambient temperature" includes the air temperature of at least a portion of the surrounding environment of the vehicle 100. For instance, the ambient temperature can be the air temperature near an exterior portion of the vehicle 100. The ambient temperature sensor(s) 296 can be any suitable sensor that can sense an ambient temperature. For example, the ambient temperature sensor(s) 296 can include a mechanical thermometer, a bimetal sensor, a thermistor, a thermocouple, a resistance thermometer, and/or a silicon bandgap sensor. In one or more arrangements, the ambient temperature sensor(s) 296 can be at least partially located at, on, or proximate to an exterior surface of the vehicle 100. In some arrangements, the ambient temperature sensor(s) 296 can be separate from the vehicle 100. For instance, the vehicle 100 can receive signals from an exterior ambient temperature sensor 296. In some examples, the vehicle can receive ambient temperature information from a weather service, a remote server, or application software.

Figure 2:
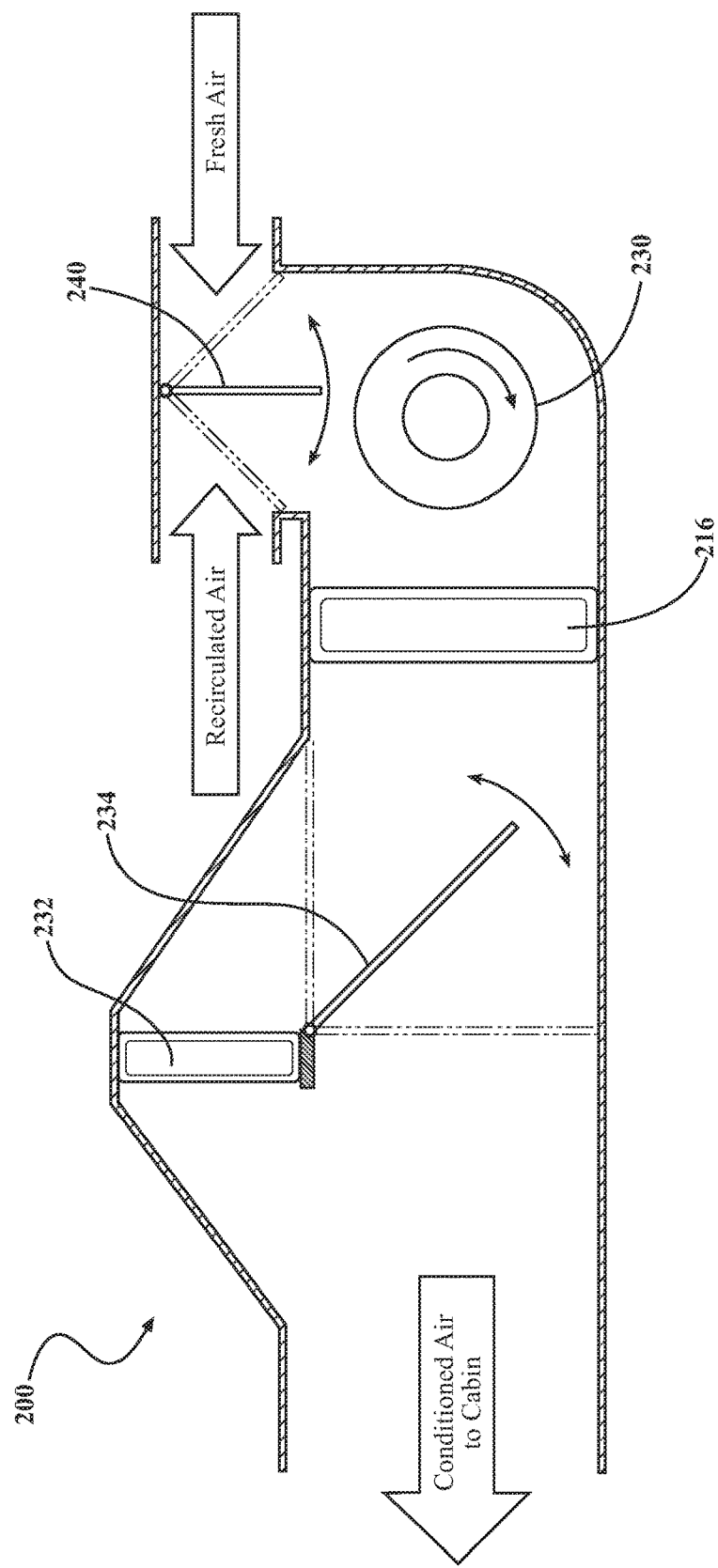
FIG. 2 is an example of a heating, ventilating, and air conditioning system.

Referring now to FIG. 2, a portion of the HVAC system 200 can be shown. In one or more arrangements, the intake mode switch 240 can move to allow recirculated air and/or fresh air into the system. For example, the intake mode switch 240 can include a door that is movable between a first position that allows only fresh air to the blower 230, and a second position that allows only recirculated air to the blower 230. In one or more arrangements, the blower 230 can be activated to move air towards and through the evaporator 216. In one or more arrangements, the HVAC system 200 can include a heater core 232 to heat air traveling to the interior of the vehicle 100. An air mix door 234 can be included in the HVAC system 200 to direct air towards or away from the heater core 232.

During operation of the HVAC system 200, the evaporator temperature can directly affect the temperature of air being introduced to the interior of the vehicle 100. For instance, the cooler the evaporator temperature, the cooler the air being introduced to the interior. With this in mind, the HVAC system 200 can be operated based on a TEO temperature. As used herein, "target evaporator outlet temperature" or "TEO temperature" is any desired temperature for an outlet portion of the evaporator 216 during operation of the HVAC system 200.

In one or more arrangements, the compressor 212 can be operated based on the TEO temperature. The evaporator temperature can be inversely related to the amount of fluid pumped by the compressor 212. For instance, more fluid moved by the compressor 212 can result in lower temperatures within the evaporator 216. In arrangements where the compressor 212 is a fixed compressor, the compressor 212 can be alternated between activated (ON) and deactivated (OFF) states. Operating the compressor 212 with longer activated periods and/or shorter deactivated periods can cool the evaporator 216 to a lower temperature. In arrangements in which the compressor 212 is a variable compressor, the evaporator temperature can be altered based on a speed of the compressor. For example, the variable compressor can be operated at a higher speed to reduce the evaporator temperature. In one or more arrangements, the controller(s) 250 can control the operation of the compressor 212 based on a TEO temperature. For instance, the controller(s) 250 can control the compressor 212 based on the TEO temperature and information received from the water temperature sensor(s) 292, the evaporator temperature sensor(s) 294, and/or the ambient temperature sensor(s) 296.

In one or more arrangements, the HVAC system 200, can be operated based on one or more TEO temperature maps. "TEO temperature map" can include any one or more values for a TEO temperature for the HVAC system 200. As described below and shown in FIG. 4, the TEO temperature map can be based on a water temperature of the engine of the vehicle 100. As described below and shown in FIG. 5, the TEO temperature maps can provide TEO temperatures based on ambient temperatures.

Figure 3:
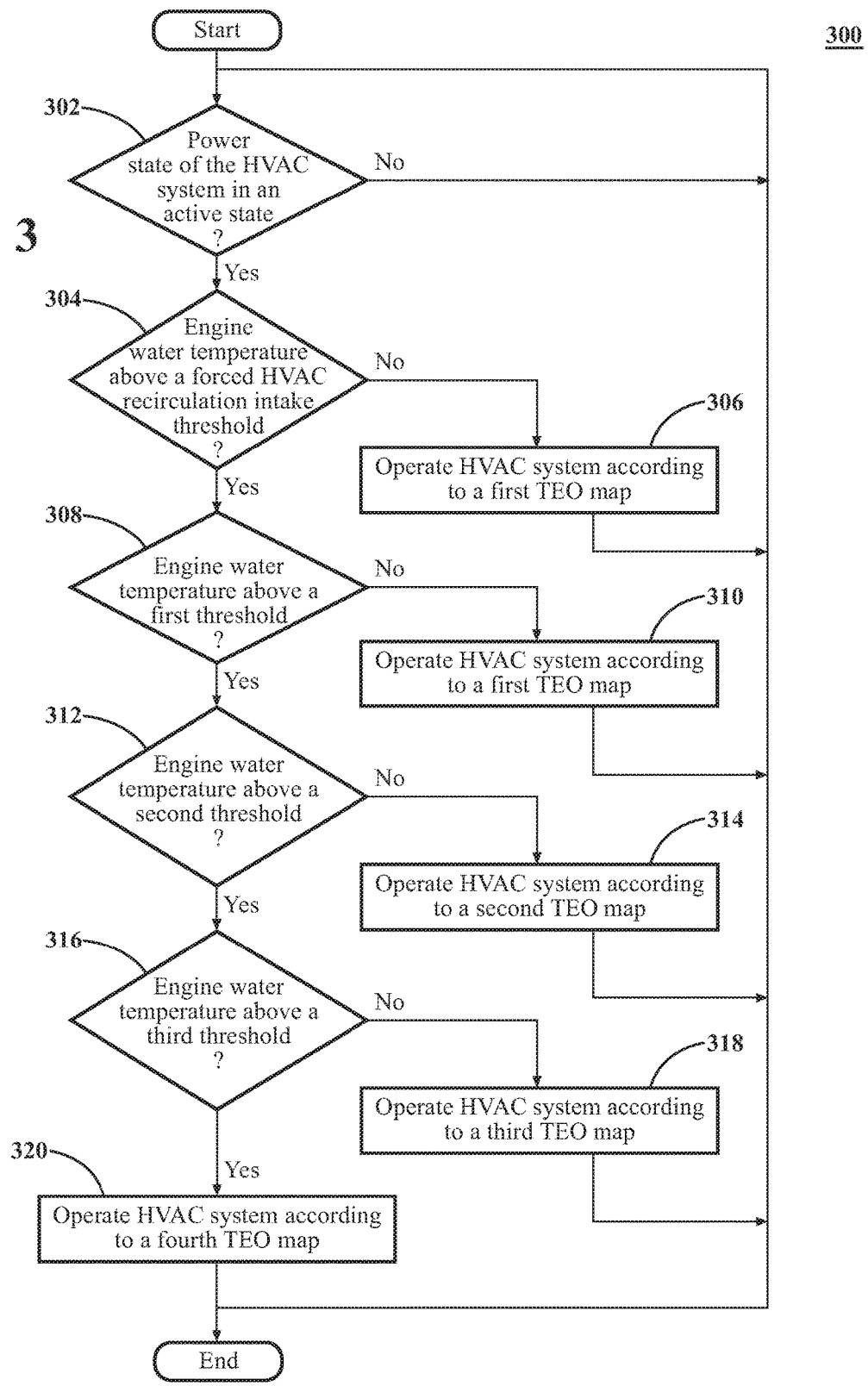
FIG. 3 is an example of a method of operating the heating, ventilating, and air conditioning system of FIG. 2.

Now that the various potential systems, devices, elements and/or components of the vehicle 100 have been described, various methods to operate an HVAC system will now be described. Referring now to FIG. 3, an example of a method of operating an HVAC system is shown. Various possible steps of method 300 will now be described. The method 300 illustrated in FIG. 3 may be applicable to the embodiments described above in relation to FIGS. 1 and 2, but it is understood that the method 300 can be carried out with other suitable systems and arrangements. Moreover, the method 300 may include other steps that are not shown here, and in fact, the method 300 is not limited to including every step shown in FIG. 3. The steps that are illustrated here as part of the method 300 are not limited to this particular chronological order. Indeed, some of the steps may be performed in a different order than what is shown and/or at least some of the steps shown can occur simultaneously. In one or more arrangements, one or more steps of the method 300 can be performed by the controller(s) 250.

At block 302, the method 300 determines whether a power state of the HVAC system 200 is in an active state. As used herein, "active state" can include any conditions in which one or more components of the HVAC system 200 is operable to change conditions within the vehicle 100. For example, the active state can include conditions in which the compressor 212 is active. Alternatively or in addition, one or more of the sensors 290 that are operatively connected to the controller(s) 250 can determine if the HVAC system 200 is in an active state. In some arrangements, the determining can be done by the controller(s) 250. If it is determined that the power state of the HVAC system is not in an active state, the method 300 can then end. Alternatively, the method 300 can return to block 302. If it is determined that the HVAC system 200 is in an active state the method 300 can continue to block 304.

At block 304, the method 300 determines whether an engine water temperature meets a forced HVAC recirculation intake threshold. The determination can include, for example, determining whether the engine water temperature is substantially equal to and/or greater than a predetermined value. In some arrangements, the determination can be done by the controller(s) 250. Further, the determination can be based on information received by the water temperature sensor(s) 292. The forced HVAC recirculation intake threshold can be a fixed value or a range of values. Alternatively or in addition, the forced HVAC recirculation intake threshold can vary over time. For example, the forced HVAC recirculation intake threshold can vary based on one or more environmental or vehicular conditions, such as an ambient temperature, ambient humidity, ambient pressure, vehicle speed, and/or vehicle location just to name a few possibilities.

If it is determined that the forced HVAC recirculation intake threshold is not met, the HVAC system 200 can be operated based on a first TEO temperature map at block 306. The first TEO temperature map can be Map 1 shown in FIG. 5. In some arrangements, the first TEO temperature map can include TEO temperatures lower than those of other TEO temperature maps. The method 300 can then end. Alternatively, the method 300 can return to block 302.

If it is determined that the forced HVAC recirculation intake threshold is met, method 300 can include determining whether the engine water temperature meets one or more predetermined thresholds as will be described below with respect to blocks 308, 312, and 316. For example, as described below, first, second, and/or third thresholds can be used in the method 300. In some arrangements, the first, second, and/or third thresholds can be stored in the data store(s) 260. The first, second, and/or third thresholds can be fixed values or ranges of values. Alternatively or in addition, the first, second, and/or third threshold can vary over time. In one or more arrangements, the first, second, and third thresholds are different from each other. For instance, the third threshold can include one or more values that are higher than that of the second threshold, and the second threshold can include one or more values higher than that of the first threshold. The controller(s) 250 can compare information received from the sensors 290 with the first, second, and/or third thresholds stored in the data store(s) 260 to determine whether the engine water temperature meets one or more of the first, second, and/or third thresholds. For example, a temperature sensed by the water temperature sensor(s) 292 can be compared with the first, second, and/or third thresholds.

At block 308 the method 300 determines whether the engine water temperature meets a first threshold. In one or more arrangements, the water temperature sensed by the water temperature sensor(s) 292 can be compared with the first threshold. In some arrangements, the first threshold can be met if the water temperature is greater than and/or equal to the first threshold.

If it is determined that the engine water temperature is not above a first threshold, the HVAC system 200 can be operated based on the first TEO temperature map at block 310. The method 300 can then end. Alternatively, the method 300 can return to block 302.

If it is determined that the engine water temperature does meet the first threshold, the method 300 can continue to block 312. It can be determined whether the engine water temperature meets a second threshold. In one or more arrangements, the water temperature sensed by the water temperature sensor(s) 292 can be compared with the second threshold. In some arrangements, the second threshold can be met if the water temperature is greater than and/or equal to the second threshold.

Figure 5:
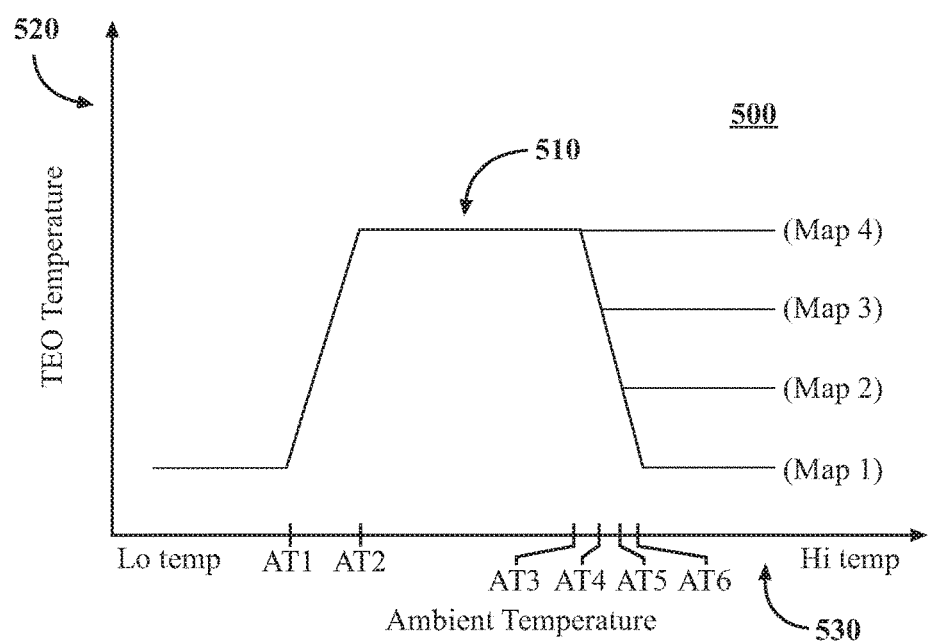
FIG. 5 is an example graph showing multiple target evaporator outlet temperature maps having target evaporator outlet temperatures based on ambient temperature.

If it is determined that the engine water temperature does not meet the second threshold, but does meet the first threshold, the HVAC system 200 can be operated based on a second TEO temperature map at block 314. In some arrangements, the second TEO temperature map can include TEO temperatures higher than those of the first TEO temperature map. For instance, the second TEO temperature map can be Map 2 as shown in FIG. 5. The method 300 can then end. Alternatively, the method 300 can return to block 302.

If it is determined that the engine water temperature does meet the second threshold, the method 300 can continue to block 316. It can be determined whether the engine water temperature meets a third threshold. In one or more arrangements, the water temperature sensed by the water temperature sensor(s) 292 can be compared with the third threshold. In some arrangements, the third threshold can be met if the water temperature is greater than and/or equal to the third threshold.

If it is determined that the engine water temperature does not meet the third threshold, but is above the first and second thresholds, the HVAC system 200 can be operated based on a third TEO temperature map at block 318. In some arrangements, the third TEO temperature map can include TEO temperatures higher than those of the first and second TEO temperature maps. For instance, the third TEO temperature map can be Map 3 as shown in FIG. 5. The method 300 can then end. Alternatively, the method 300 can return to block 302.

If it is determined that the engine water temperature does meet the third threshold, the HVAC system 200 can be operated based on a fourth TEO temperature map at block 320. In some arrangements, the fourth TEO temperature map can include TEO temperatures higher than those of the first, second, and third TEO temperature maps. For instance, the fourth TEO temperature map can be Map 4 as shown in FIG. 5. The method 300 can then end. Alternatively, the method 300 can return to block 302.

Figure 4:
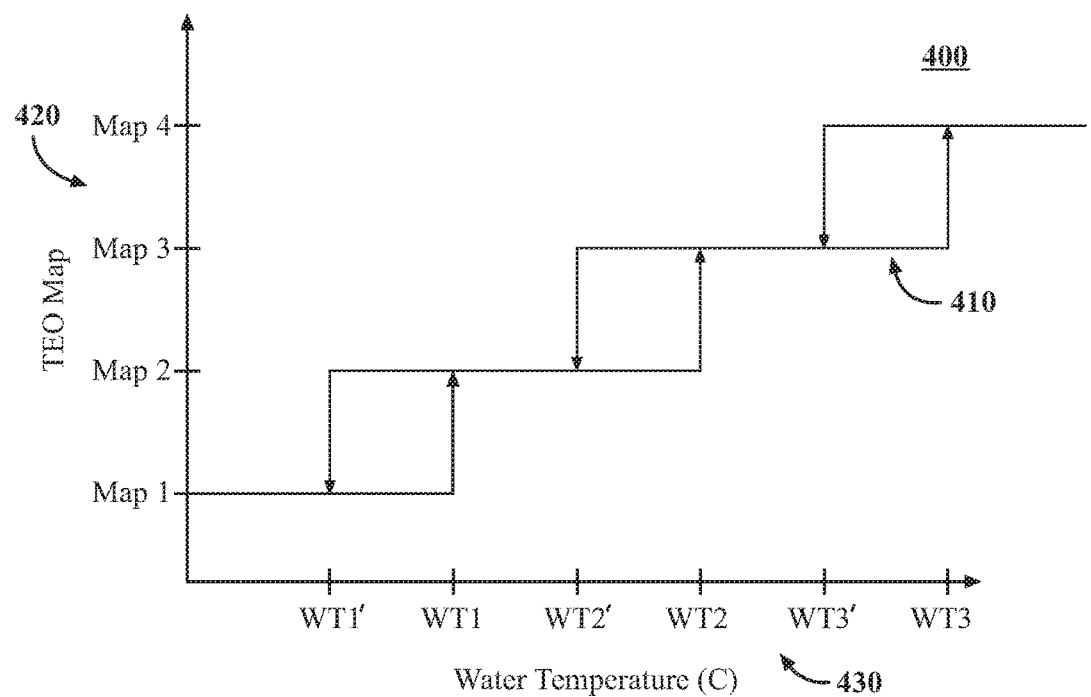
FIG. 4 is an example graph showing target evaporator outlet temperature maps based on engine water temperatures.

FIG. 4 shows an example TEO temperature map chart 400 that includes TEO temperature maps 410 plotted as a function of water temperature 420. In the example shown in FIG. 4, the HVAC system 200 can be operated based on a TEO map 1 for water temperatures below a first threshold temperature WT1. If the water temperature meets the first threshold temperature WT1, and is below a second threshold temperature WT2, the HVAC system 200 can be operated based on a TEO map 2. If the water temperature meets the second threshold temperature WT2, and is below a third threshold temperature WT3, the HVAC system 200 can be operated based on a TEO map 3. If the water temperature meets the third threshold temperature WT3, the HVAC system 200 can be operated based on a TEO map 4.

In one or more arrangements, as the water temperature 420 drops, the HVAC system 200 can be operated based on changing TEO temperature maps. For instance, as water temperature drops at WT3' the HVAC system 200 can be operated based on the TEO Map 3; as the water temperature drops at WT2' the HVAC system 200 can be operated based on the Map 2; and as the water temperature drops at WT1' the HVAC system 200 can be operated based on the Map 1. In the example shown in FIG. 4, WT1' can be below WT1, WT2' can be below WT2, and WT3' can be below WT3 to provide hysteresis to the system.

As shown in FIG. 5, the TEO temperature maps can vary based on an ambient temperature. For instance, the graph 500 can show TEO temperature 510 plotted as a function of ambient temperature 520. The TEO temperatures for low ambient temperatures can be low. Between ambient temperatures AT1 and AT2, the TEO temperature can increase to a higher level. In the example graph 500, during higher ambient temperatures the TEO temperature maps can have different TEO temperature values. In some arrangements, the TEO temperature maps (Maps 1-4 in FIG. 5) can be based on water temperature as described above in connection with FIGS. 3 and 4. As one non-limiting example, depending on the engine water temperature, the HVAC system 200 can be operated based on one of the Maps 1-4. For Map 1, the TEO temperature is decreased until the ambient temperature reaches AT6, then the TEO temperature is held constant. For Map 2, the TEO temperature is decreased until the ambient temperature reaches AT5, then the TEO temperature is held constant. For Map 3, the TEO temperature is decreased until the ambient temperature reaches AT4, then the TEO temperature is held constant. For Map 4, the TEO temperature is held constant above the ambient temperature AT3.

While four TEO temperature maps are shown in FIGS. 4 and 5, it is to be appreciated that a greater or lesser number of TEO temperature maps can be used to control the compressor 212. For example, five or more TEO temperature maps can be used based on engine water temperature. Further, while the Maps 1-4 shown in FIG. 5 include portions of constant TEO temperatures, it is to be appreciated that one or more TEO temperature maps can include portions that vary based on ambient temperature. For example, one or more of the TEO temperature maps can include portions where a TEO temperatures increase as ambient temperature increases.

It will be appreciated that arrangements described herein can provide numerous benefits, including one or more of the benefits mentioned herein. Arrangements described herein can reduce required engine torque for a vehicle HVAC system. For example, during certain conditions, a compressor can be operated based on a TEO temperature map that reduces the load on an engine. The TEO temperature map can include increased TEO temperatures, which reduces the power needed by the compressor. Arrangements can reduce required engine torque, engine water temperature, and exhaust gas temperature. This can lead to the reduction of heat damage to parts surrounding exhaust components, increased tow capacity through lower engine temperatures, and the reduction of fuel consumption. Such arrangements can be especially useful for turbo-charged engines, as they have increased heat load at high engine load and require additional cooling capacity. Arrangements described herein can eliminate or reduce additional cooling heat exchangers, which can improve packaging and safety (such as in small overlap and pedestrian impact conditions).

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of operating a heating, ventilating, and air conditioning (HVAC) system in a vehicle, the HVAC system including a compressor operable based on a first target evaporator outlet (TEO) temperature map, the method comprising:
   determining whether an engine water temperature meets a forced HVAC recirculation intake threshold;
   responsive to determining that the engine water temperature meets the forced HVAC recirculation intake threshold, determining if the engine water temperature meets a first threshold; and
   responsive to determining that the engine water temperature meets the first threshold, operating the compressor based on a second TEO temperature map, the second TEO temperature map including higher TEO temperatures than the first TEO temperature map.

2. The method of claim 1, further including the steps of:
   determining if the engine water temperature meets a second threshold; and
   responsive to determining that the engine water temperature meets the second threshold, operating the compressor based on a third TEO temperature map, the third TEO temperature map including higher TEO temperatures than the second TEO temperature map.

3. The method of claim 2, further including the steps of:
   determining if the engine water temperature meets a third threshold; and
   responsive to determining that the engine water temperature meets the third threshold, operating the compressor based on a fourth TEO temperature map, the fourth TEO temperature map including higher TEO temperatures than the third TEO temperature map.

4. The method of claim 3, wherein each of the first, second, third, and fourth TEO temperature maps include TEO temperatures as a function of ambient temperature.

5. The method of claim 4, wherein the first TEO temperature map includes a constant range of TEO temperatures above a first ambient temperature, the second TEO temperature map includes a constant range of TEO temperatures above a second ambient temperature, the third TEO temperature map includes a constant range of TEO temperatures above a third ambient temperature, and the fourth TEO temperature map includes a constant range of TEO temperatures above a fourth ambient temperature.

6. The method of claim 5, wherein the first ambient temperature is greater than the second ambient temperature, the second ambient temperature is greater than the third ambient temperature, and the third ambient temperature is greater than the fourth ambient temperature.

7. The method of claim 1, wherein the forced HVAC recirculation intake threshold is a fixed temperature value, the first threshold is a fixed temperature value, and the forced HVAC recirculation intake threshold is less than the first threshold.

8. The method of claim 7, wherein the engine water temperature meets the first threshold when the engine water temperature is greater than the first threshold.

9. A vehicle heating, ventilating, and air conditioning (HVAC) system comprising:
   a temperature sensor operable to measure an engine water temperature;
   a compressor configured for operation based on a first target evaporator outlet (TEO) temperature map; and
   a controller operatively connected to the sensor system and the compressor, the controller being programmed to:
      determine whether an engine water temperature meets a forced HVAC recirculation intake threshold;

responsive to determining that the engine water temperature meets the forced HVAC recirculation intake threshold, determine if the engine water temperature meets a first threshold; and responsive to determining that the engine water temperature meets the first threshold, operate the compressor based on a second TEO temperature map, the second TEO temperature map including higher TEO temperatures than the first TEO temperature map.

10. The system of claim 9, wherein the controller is further programmed to:

determine if the engine water temperature meets a second threshold; and responsive to determining that the engine water temperature meets the second threshold, operate the compressor based on a third TEO temperature map, the third TEO temperature map including higher TEO temperatures than the second TEO temperature map.

11. The system of claim 10, wherein the controller is further programmed to:

determine if the engine water temperature meets a third threshold; and responsive to determining that the engine water temperature meets the third threshold, operate the compressor based on a fourth TEO temperature map, the fourth TEO temperature map including higher TEO temperatures than the third TEO temperature map.

12. The system of claim 11, wherein each of the first, second, third, and fourth TEO temperature maps include TEO temperatures as a function of ambient temperature.

13. The system of claim 12, wherein the first TEO temperature map includes a constant range of TEO temperatures above a first ambient temperature, the second TEO temperature map includes a constant range of TEO temperatures above a second ambient temperature, the third TEO temperature map includes a constant range of TEO temperatures above a third ambient temperature, and the fourth TEO temperature map includes a constant range of TEO temperatures above a fourth ambient temperature.

14. The system of claim 13, wherein the first ambient temperature is greater than the second ambient temperature, the second ambient temperature is greater than the third ambient temperature, and the third ambient temperature is greater than the fourth ambient temperature.

15. The system of claim 9, wherein the forced HVAC recirculation intake threshold is a fixed temperature value, the first threshold is a fixed temperature value, and the forced HVAC recirculation intake threshold is less than the first threshold.

16. The system of claim 15, wherein the engine water temperature meets the first threshold when the engine water temperature is greater than the first threshold.

17. A method of operating a heating, ventilating, and air conditioning (HVAC) system in a vehicle, the HVAC system including a compressor operable based a first target evaporator outlet (TEO) temperature map, the method comprising:

determining whether an engine water temperature meets a forced HVAC recirculation intake threshold;

responsive to determining that the engine water temperature meets the forced HVAC recirculation intake threshold:
 determining if the engine water temperature meets a first threshold;
 determining if the engine water temperature meets a second threshold; and
 determining if the engine water temperature meets a third threshold;

responsive to determining that the engine water temperature meets the first threshold but not the second or third thresholds, operating the compressor based on a second TEO temperature map, the second TEO temperature map including higher TEO temperatures than the first TEO temperature map;

responsive to determining that the engine water temperature meets the first and second thresholds but not the third threshold, operating the compressor based on a third TEO temperature map, the third TEO temperature map including higher TEO temperatures than the second TEO temperature map; and responsive to determining that the engine water temperature meets the first, second, and third thresholds, operating the compressor based on a fourth TEO temperature map, the fourth TEO temperature map including higher TEO temperatures than the third TEO temperature map.

18. The method of claim 17, wherein each of the first, second, third, and fourth TEO temperature maps include TEO temperatures as a function of ambient temperature.

19. The method of claim 18, wherein the first TEO temperature map includes a constant range of TEO temperatures above a first ambient temperature, the second TEO temperature map includes a constant range of TEO temperatures above a second ambient temperature, the third TEO temperature map includes a constant range of TEO temperatures above a third ambient temperature, and the fourth TEO temperature map includes a constant range of TEO temperatures above a fourth ambient temperature.

20. The method of claim 19, wherein the first ambient temperature is greater than the second ambient temperature, the second ambient temperature is greater than the third ambient temperature, and the third ambient temperature is greater than the fourth ambient temperature.

* * * * *